United States Patent
Taguchi et al.

(10) Patent No.: US 7,213,021 B2
(45) Date of Patent: May 1, 2007

(54) METHOD AND APPARATUS FOR STORAGE NETWORK MANAGEMENT

(75) Inventors: Yuichi Taguchi, San Jose, CA (US); Naoki Watanabe, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 344 days.

(21) Appl. No.: 10/799,988

(22) Filed: Mar. 11, 2004

(65) Prior Publication Data

US 2005/0203910 A1   Sep. 15, 2005

(51) Int. Cl.
*G06F 7/00* (2006.01)
*G06F 17/30* (2006.01)

(52) U.S. Cl. .................. 707/10; 709/203; 713/200; 702/182; 370/254

(58) Field of Classification Search ............... 709/203; 713/200; 702/182, 200; 370/254
See application file for complete search history.

(56) References Cited

U.S. PATENT DOCUMENTS

| | | | |
|---|---|---|---|
| 5,557,747 A | 9/1996 | Rogers et al. | |
| 6,009,466 A | 12/1999 | Axberg et al. | |
| 6,170,009 B1 | 1/2001 | Mandal et al. | |
| 6,393,474 B1 | 5/2002 | Eichert et al. | |
| 6,687,651 B2 * | 2/2004 | Stewart | 702/182 |
| 2001/0054093 A1 | 12/2001 | Iwatani | |
| 2004/0098606 A1 * | 5/2004 | Tan et al. | 713/200 |
| 2005/0018619 A1 * | 1/2005 | Banks et al. | 370/254 |
| 2005/0114438 A1 * | 5/2005 | Bendich et al. | 709/203 |

OTHER PUBLICATIONS

"EMC ControlCenter Automated Resource Manager," product data sheet, $EMC^2$ Corporation Hopkinton, MA, (2002).
Bagasrawala "Next Generation VPNs," Lucent Technologies White Paper, Lucent Technologies, Inc. Murray Hill, NJ (2001).
Clark Security in IP Storage Networks, *IP SANs a guide to ISCSI, IFCP, and FCIP Protocols for Storage Area Networks*, Addison—Wesley Publishing Company, pp. 167-178 (2001).
King "LUN Masking in a SAN," Qlogic Communications, Inc. Aliso Viejo, CA (2001).

* cited by examiner

*Primary Examiner*—Don Wong
*Assistant Examiner*—Patrick A. Darno
(74) *Attorney, Agent, or Firm*—Townsend and Townsend and Crew LLP

(57) ABSTRACT

A storage service manager facilitates an operator's task for managing large-scale storage facilities. Allocating access paths on the storage network is accomplished by the use agent programs which interface to various components comprising a data path from the client to the storage system. The agent programs hide various vendor-specific and technology-dependent aspects of the storage network components from the user.

17 Claims, 15 Drawing Sheets

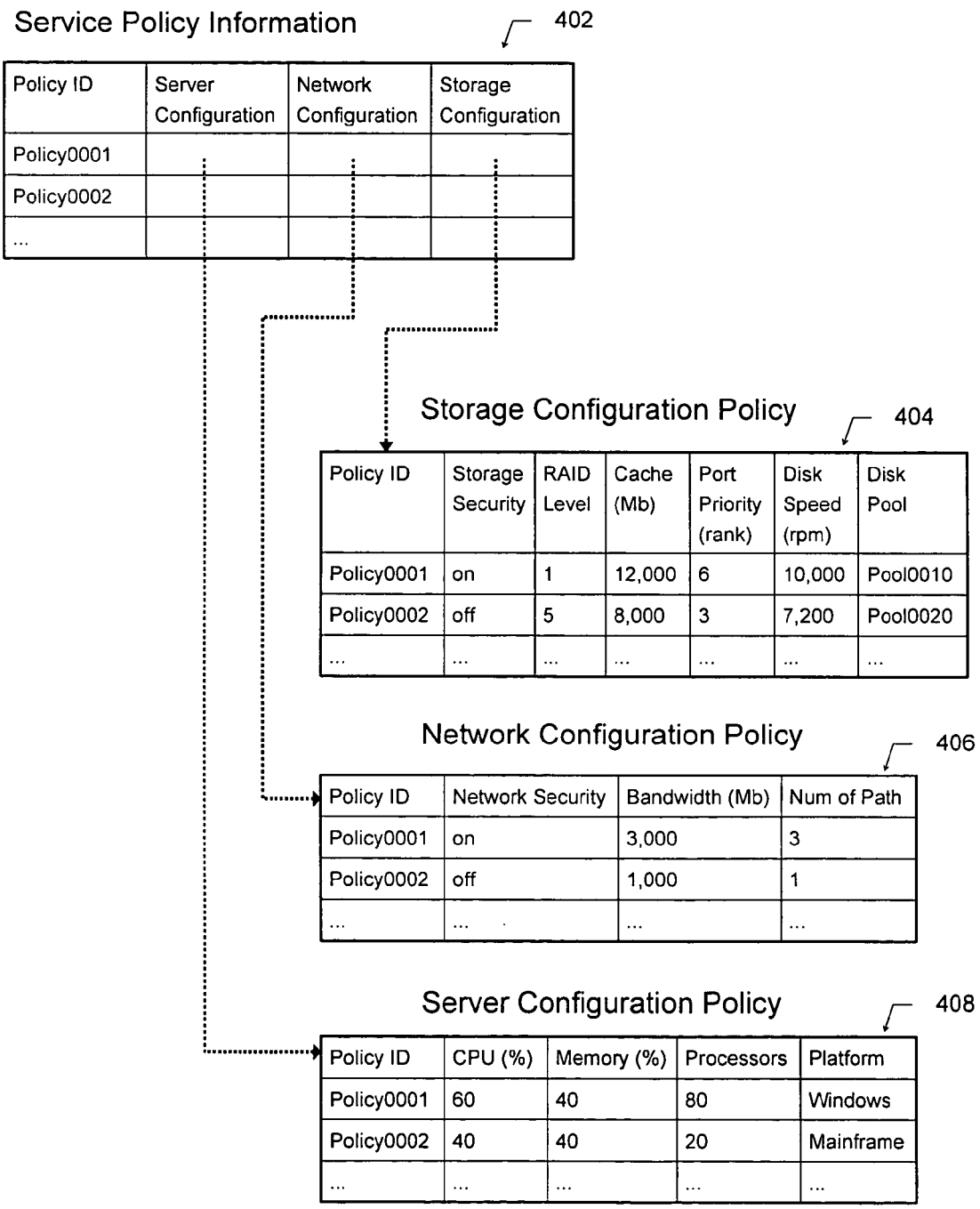
Fig. 4 Policy Information Data Structure

Storage Pool Information  ⎯ 502

| Pool ID | Total Capacity (Mb) | Free Capacity (Mb) | LDEVs |
|---|---|---|---|
| Pool0010 | 30,000,000 | 22,500,000 | |
| Pool0020 | 2,000,000 | 2,000,000 | |
| | | | |

Logical Device Information ⎯ 504

| LDEV ID | Capacity (Mb) | Consumed | Disk Groups |
|---|---|---|---|
| LDEV0BCC | 7384 | Yes | DGRP1053 |
| LDEV0BCD | 7384 | Yes | DGRP1053 |
| | | | |

Disk Group Information ⎯ 506

| Disk Group ID | RAID Level | Capacity (Mb) | Num of LDEVs | Disk Speed (rpm) | Format |
|---|---|---|---|---|---|
| DGRP1053 | RAID1 | 72,000 | 37 | 10,000 | OPEN-9 |
| DGRP3026 | RAID5 | 72,000 | 29 | 7,200 | 3390-3 |
| | | | | | |

Fig. 5 Storage Pool Information

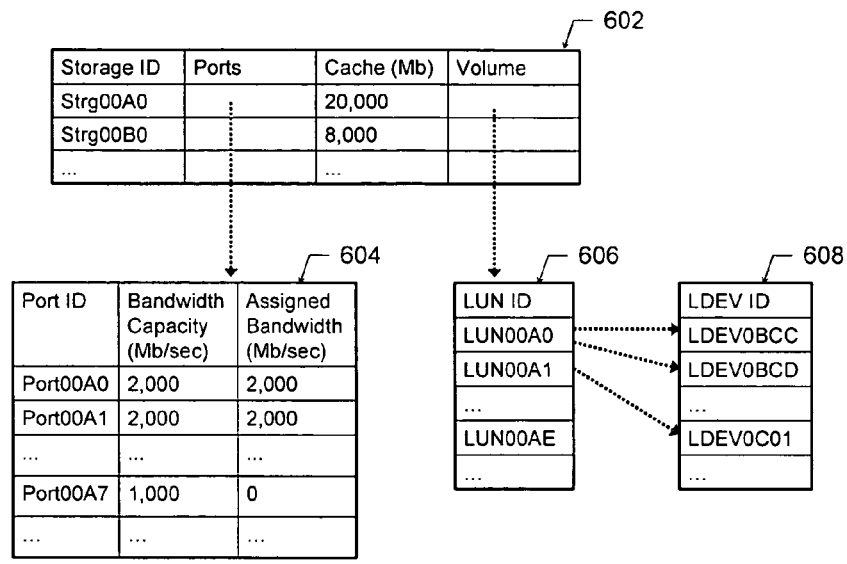
Fig. 6 Storage Configuration Information
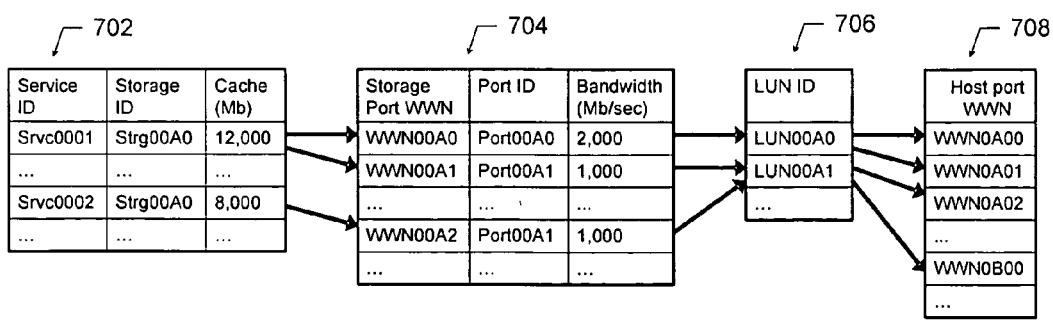
Fig. 7 Storage Service Information

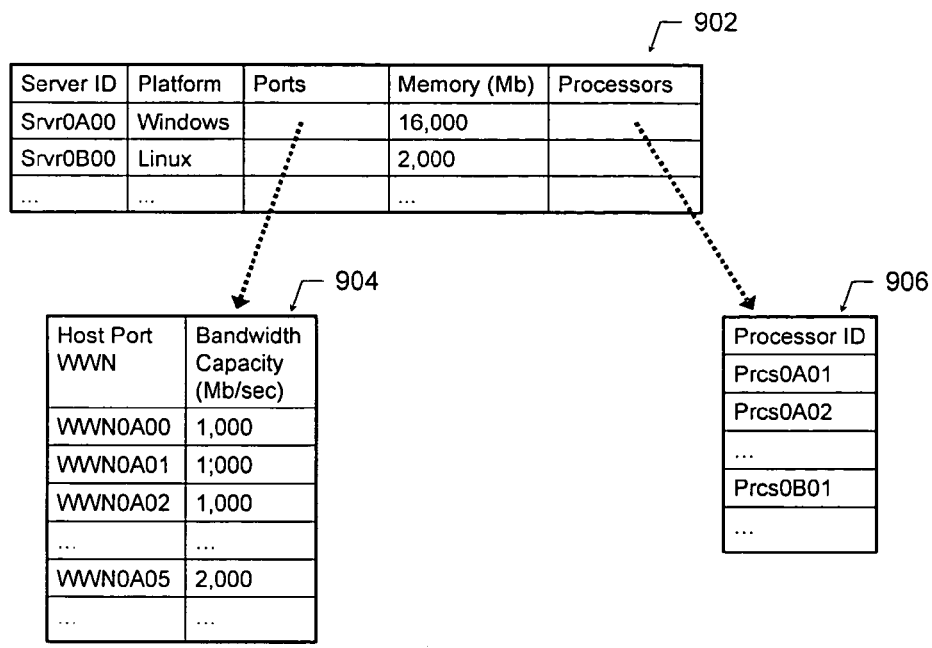
Fig. 9 Server Configuration Information
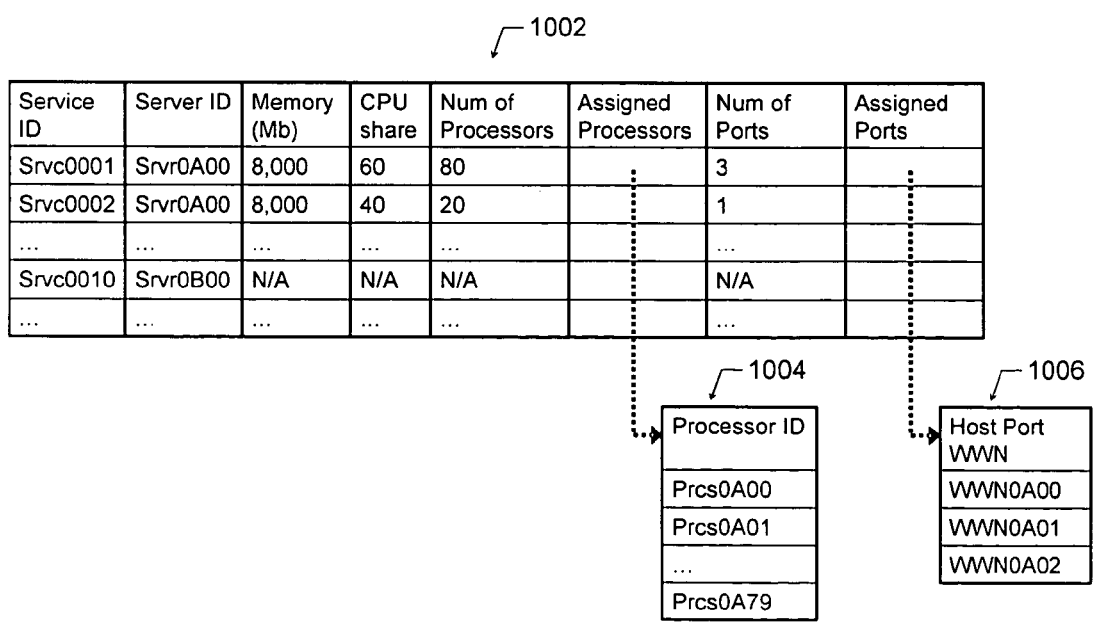
Fig. 10 Server Service Information

| Source Object | | Destination Object | |
|---|---|---|---|
| Object ID | Port ID | Object ID | Port ID |
| Server00A0 | WWN0A00 | Sw00A0 | Port00A1 |
| Server00A0 | WWN0A01 | Sw00B0 | Port00B3 |
| ... | ... | ... | ... |
| Sw00A0 | Port00A2 | Sw00D0 | Port00D4 |
| Sw00B0 | Port00B2 | Sw00C0 | Port00C1 |
| Sw00C0 | Port00C5 | Sw00D0 | Port00D6 |
| ... | ... | ... | ... |
| Sw00D0 | Port00D2 | Strg00A0 | WWN00A0 |
| ... | ... | ... | ... |

Fig. 11 Network Topology Information

| Network ID | Type | Device Objects | Security |
|---|---|---|---|
| Net0AA0 | Fibre Channel | | WWN Zoning |
| Net0AB0 | Ethernet | | Virtual LAN |
| ... | ... | ... | |

| Object ID |
|---|
| Sw00A0 |
| Sw00B0 |
| Sw00C0 |
| ... |

Fig. 12 Network Configuration Information

| Service ID | Path ID | Host Port WWN | Storage Port WWN | Zone ID | Bandwidth (Mb/sec) | Objects |
|---|---|---|---|---|---|---|
| Srvc0001 | Path0011 | WWN0A00 | WWN00A0 | Zone0A00 | 1,000 | |
| | Path0021 | WWN0A01 | WWN00A0 | Zone0A00 | 1,000 | |
| | Path0031 | WWN0A02 | WWN00A1 | Zone0A00 | 1,000 | |
| Srvc0002 | Path0012 | WWN0B00 | WWN00A1 | Zone0B00 | 1,000 | |
| ... | ... | ... | ... | | | |

| Switch ID | In Port ID | Out Port ID |
|---|---|---|
| Sw00A0 | Port00A1 | Port00A2 |
| Sw00D0 | Port00D4 | Port00D2 |
| ... | ... | ... |

Fig. 13 Network Service Information

System Status Initialization

Policy Information Definition

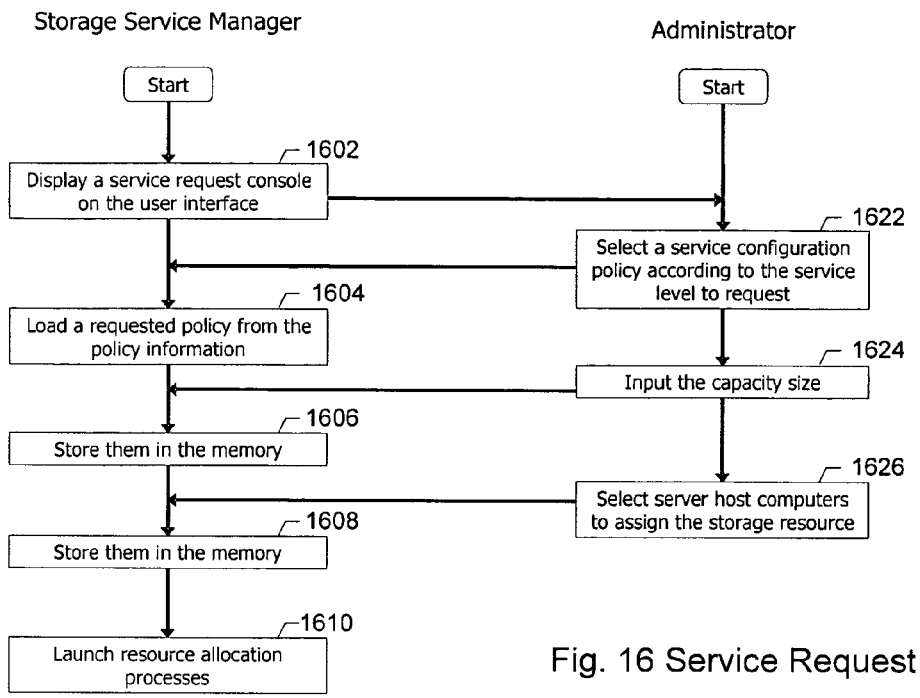
Fig. 16 Service Request
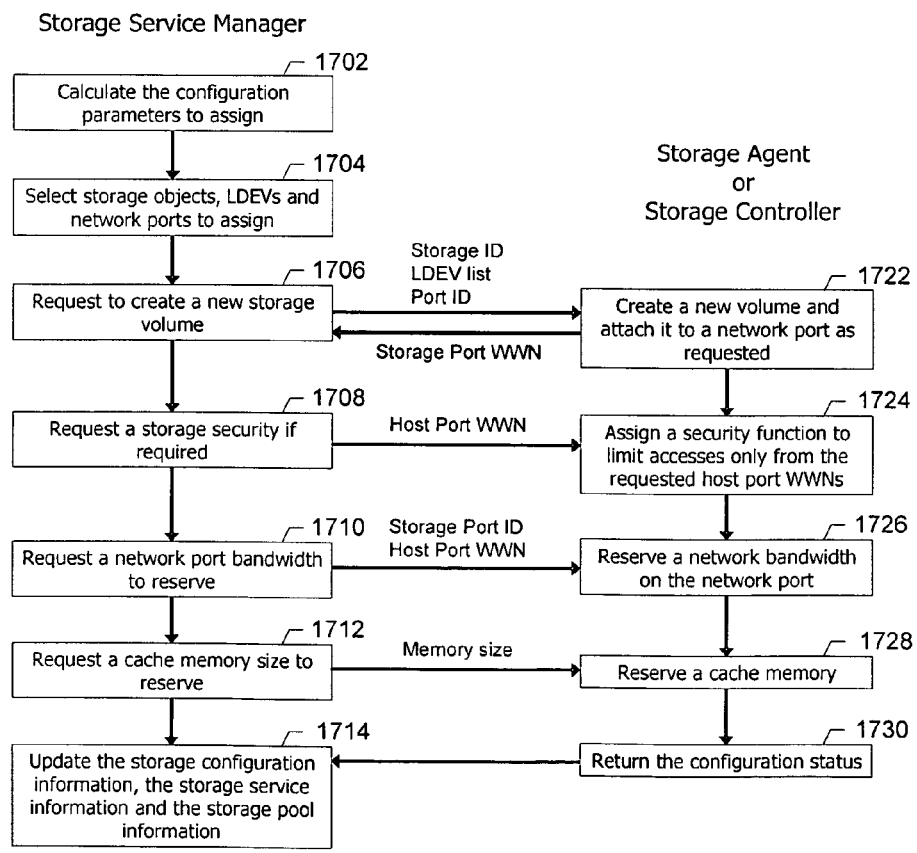
Fig. 17 Storage Configuration

```
Storage Security Enforcement Rule

If ('Storage Security' == 'on')
then
  load 'host port WWN';
  load 'storage port ID';
  apply 'LUN Security' for 'host port WWN' on 'storage port ID';
```

Fig. 17A Storage Security Enforcement

```
Port Bandwidth Calculation Rule load 'port priority in rank';
load 'storage port ID';
load 'bandwidth capacity' on 'storage port ID';
'port priority in bandwidth' := 'port priority in rank' x 'bandwidth capacity' x 1/8
```

Fig. 17B Port Bandwidth Calculation

```
LDEV Selection Rule load 'capacity size';
load 'policy ID';
load 'pool ID' from 'policy ID';
load 'disk speed' from 'policy ID';
load 'RAID level' from 'policy ID';
load 'platform type' of 'server ID';
If ('platform type' == "Windows")
then
  'format type' := OPEN;
else
  'format type' := 3390;
If ('capacity size' > 'free capacity' of 'pool ID')
then
  return FALSE;
foreach ('disk group ID') of 'pool ID'
  If ('format' of 'disk group ID' == 'format type')
  then
    If ('disk speed' of 'disk group ID' > 'disk speed')
    then
      If ('RAID level' of ' disk group ID' == 'RAID level')
      then
        get 'LDEV ID' from 'disk group ID';
```

Fig. 17C LDEV Selection

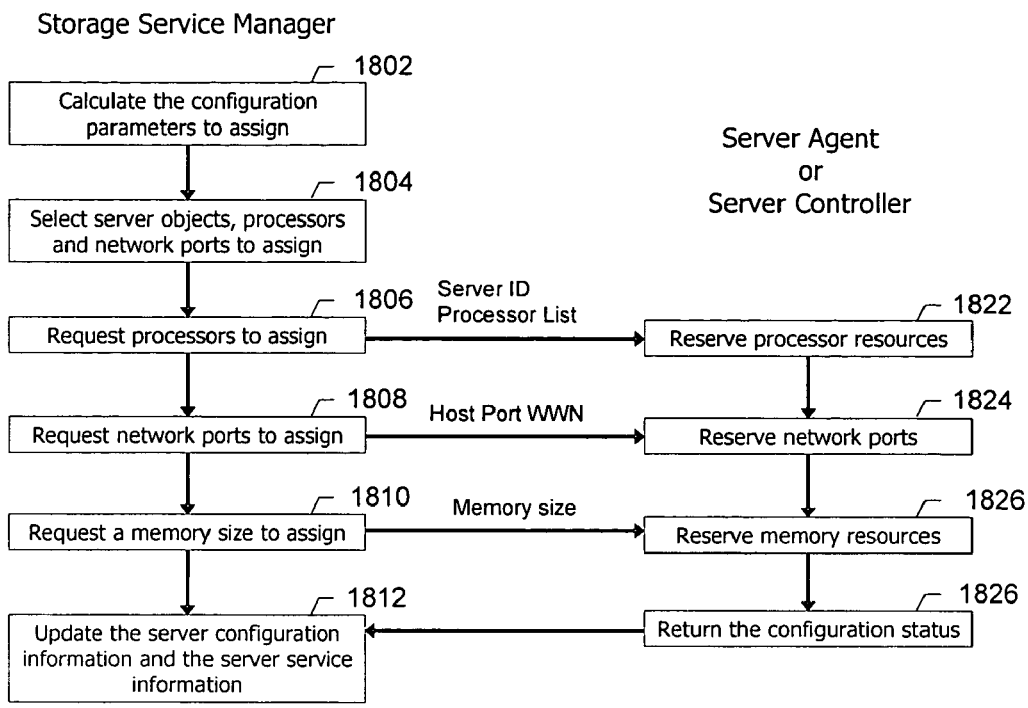
Fig. 18 Server Configuration
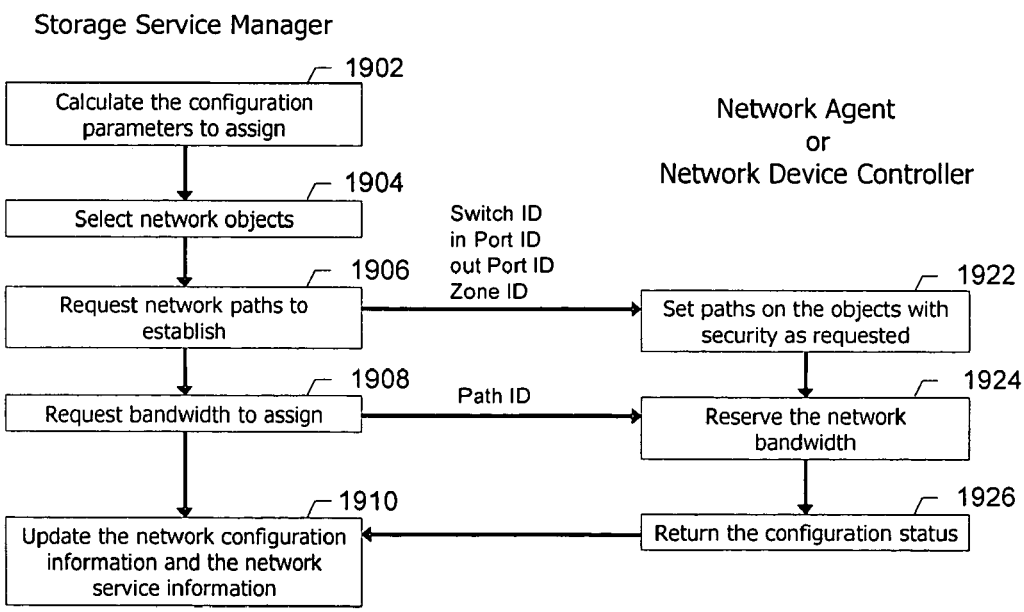
Fig. 19 Network Configuration

METHOD AND APPARATUS FOR STORAGE NETWORK MANAGEMENT

CROSS-REFERENCES TO RELATED APPLICATIONS

This application is related to commonly owned, co-pending U.S. patent application Ser. No. 09/841,710, entitled "Integrated Service Management System," filed Apr. 24, 2001, and is incorporated herein in its entirety for all purposes.

BACKGROUND OF THE INVENTION

The present invention relates to computer network systems and in particular to management of storage in a networking environment.

The adoption of computer use in every aspect of our lives has created a great demand for storage capacity. Adequate data storage is an important component in most modern enterprises. The infrastructure technology that has developed to support the Internet has been exploited to provide a variety of network-based storage solutions. FIG. 24 shows a range of storage architectures, including simple single storage/single server systems, and fibre channel technologies such as fibre channel (FC) storage area networks (SANs) and wider area FC SANs. Though not yet realized, the natural progression is toward a fully generalized IP-based (internet protocol) storage area network (shown in the figure by the dashed lines).

Several types of storage devices are manufactured. They include RAID (redundant arrays of inexpensive disks) arrays, JBOD (just a bunch of disks) configurations which are spanning architectures that do not conform to the RAID definition, NAS (network attached storage) configurations, and so on. Accessing storage devices requires communication from the host, through the switching fabric, and through servers using any of a variety of protocols; e.g. fibre channel (FC), iSCSI (internet SCSI—Small Computer System Interface), NFS, and so on.

Given such a heterogeneous collection of intermediate components, it is not a trivial task to provision storage suitable for secured access, or with a guaranteed minimum throughput, and so on. As can be appreciated, each subsystem typically can be provided by a different hardware and software manufacturers. Thus, provisioning suitable storage access typically requires detailed knowledge of each subsystem in order to provide an appropriate access path. For example, a different user interface ("agent") for configuring each component typically is required. This necessitates the use of one or more operators to administer each component (e.g., host), and to collectively coordinate the configuration of the myriad components to connect the user's host system to her storage media with the access characteristics that she requires.

It can be appreciated that there is a need to provide access to storage in a storage area network for users who have disparate storage needs in a storage system which subsystems have disparate administrative requirements. There is a need to facilitate the establishment and subsequent management of network paths in a storage area network based, for example, on security criteria.

SUMMARY OF THE INVENTION

In accordance with the present invention, a storage path configuration can be established by maintaining a store of information representing the network configuration of a network. A storage service manager can establish a segment of the storage path configuration with a host component of the network. A network agent can establish another segment of the storage path configuration with a switch component of the network. A storage agent can establish still another segment of the storage path configuration with a data storage component of the network. In accordance with an aspect of the present invention, the storage path configuration does not end at the network port of the storage facility, but rather continues into the data storage component, reaching one or more physical devices (e.g., logical units) within the data storage component. In a particular embodiment of this aspect of the invention, the internal data path can be a path to a specific logical unit (volume) defined within the data storage component. Still another aspect of the invention is to specify a storage path configuration in abstract terms to represent characteristics of the access path, in addition to the topological configuration of the physical data path.

BRIEF DESCRIPTION OF THE DRAWINGS

Aspects, advantages and novel features of the present invention will become apparent from the following description of the invention presented in conjunction with the accompanying drawings wherein:

FIG. 4 shows an illustrative representation of the information comprising the policy information;

FIG. 5 shows an illustrative representation of the information comprising the storage pool information;

FIG. 6 shows an illustrative representation of the information comprising the storage path configuration information;

FIG. 7 shows an illustrative representation of the information comprising the storage service information;

FIG. 9 shows an illustrative representation of the information comprising the server configuration information;

FIG. 10 shows an illustrative representation of the information comprising the server service information;

FIG. 11 shows an illustrative representation of the information comprising the network topology information;

FIG. 12 shows an illustrative representation of the information comprising the network configuration information;

FIG. 13 shows an illustrative representation of the information comprising the network service information;

FIG. 16 is a high level flow diagram highlighting service request processing in accordance with an illustrative embodiment of the present invention;

FIG. 17 is a high level flow diagram highlighting storage path configuration processing in accordance with an illustrative embodiment of the present invention;

FIG. 17A is an illustrative example of a storage security enforcement rule;

FIG. 17B is an illustrative example of a port bandwidth calculation;

FIG. 17C is an illustrative example of an LDEV selection rule;

FIG. 18 is a high level flow diagram highlighting server configuration processing in accordance with an illustrative embodiment of the present invention;

FIG. 19 is a high level flow diagram highlighting network configuration processing in accordance with an illustrative embodiment of the present invention;

DESCRIPTION OF THE SPECIFIC EMBODIMENTS

Figure 23:
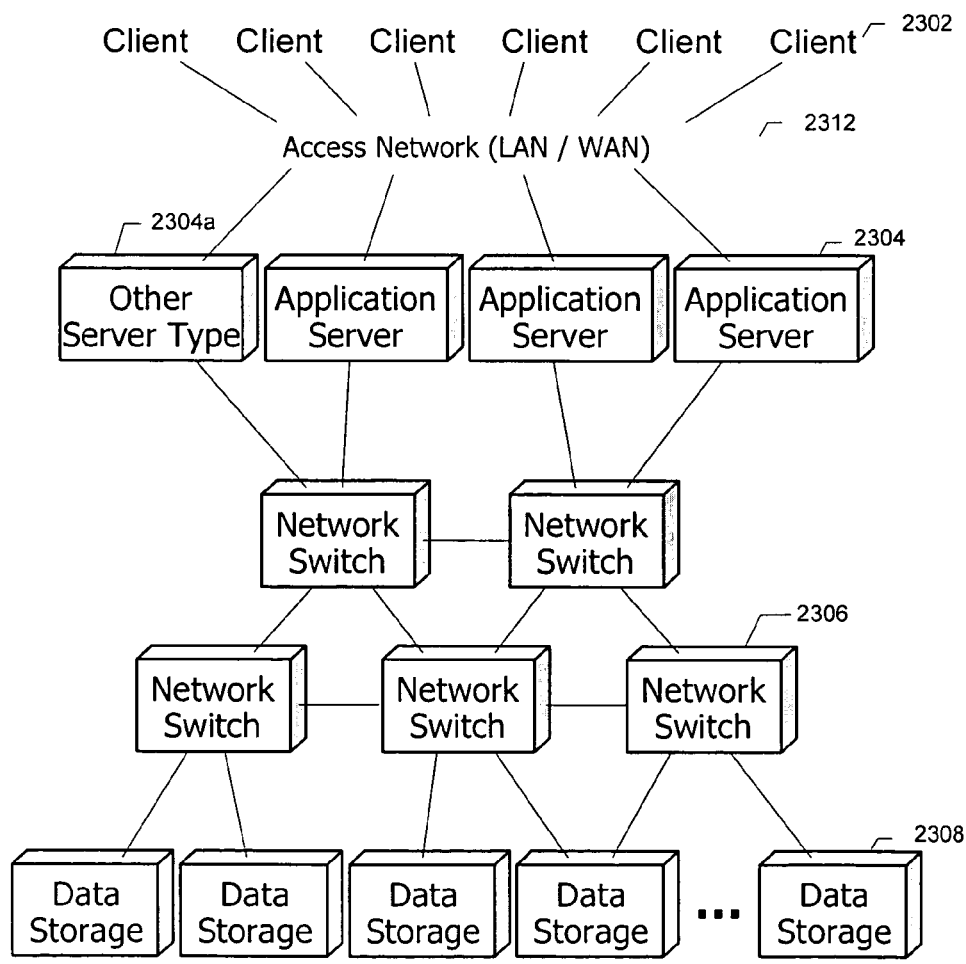
FIG. 23 shows a typical storage facility.

To provide a backdrop for discussing the embodiments of the present invention, refer for a moment to FIG. 23. The figure illustrates a typical storage area network (SAN) that can be adapted to operate in accordance with the invention. There are client components 2302 which can access various host components 2304. A typical function performed by host components is that of application servers. Application servers such as database servers tend to have intensive data storage requirements, and thus are suitable subjects for discussing the various aspects of the invention. However, it can be appreciated that other server (host) types 2304a can be adapted according to the invention. For example, an internet service provider may offer storage capacity for its registered users for hosting web sites, for uploading images, and so on. These systems also require large storage path configuration for its users. Thus, the general phrase "host component" will be understood to represent a variety of different server architectures and the like.

A communication network 2312 typically provides a communication path between the clients 2302 and hosts 2304. Data storage components 2308 represent a myriad of storage device types and configurations from different models. The data storage components can be located in a room, they may occupy an entire building, they may be located in different cities or distributed across the globe. A communication component 2306, typically comprising various switches from different models, provides multiple data paths between the host components 2304 and the data storage components. All or a portion of the communication component may be referred to as a switching fabric. The various illustrative embodiments of the present invention that will be discussed are components used to manage the network path between the hosts and data storage components through the switching fabric.

Figure 1:
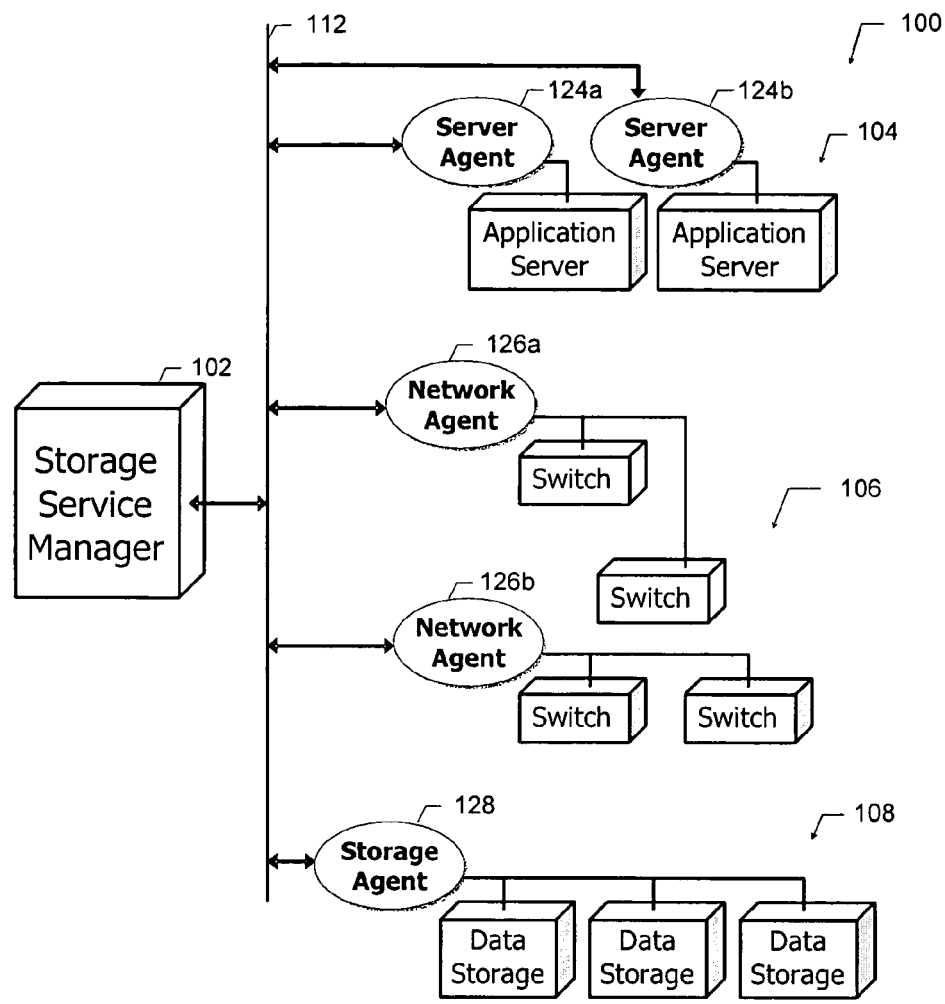
FIG. 1 shows a storage service manager in relation to components comprising a storage network system in accordance with the present invention.

FIG. 1 illustrates, in a generalized block diagram, a network architecture exemplar 100 according to the present invention. A storage service manager 102 serves as an entry point for an operator (administrator) to manage the various components in the network which comprise a "storage path configuration." Through the storage service manager, an administrator can allocate to a user he requested "storage path configuration," which in the context of the present invention, refers to the resources which can provide a specified level of I/O performance, capacity, operating characteristics, and so on by allocating appropriate components of the storage path configuration. This includes a server service, a network service, and a storage service. These components will be discussed in more detail below. The storage service manager 102 is typically a computer device configured with appropriate software components to provide the functionality that will be discussed. One such software component, for example, is a suitable user interface for accepting user input and displaying network configuration information.

A communication backbone 112 connects the storage service manager 102 to various agent components. Server agents 124a and 124b interface with respective server (host) components 104 on behalf of requests from the storage service manager 102, in order to provide the "server services" called for by the storage service manager to satisfy a particular storage path configuration. Network agents 126a and 126b, likewise, interface with respective switches in response to requests from the storage service manager in order to provide the "network services" to satisfy the requested storage path configuration. One or more storage agents 128 interface with the various data storage components 108 comprising the network to provide a storage service appropriate for the requested storage path configuration.

The number of agents for each component type (i.e., host, communication, and storage) will vary depending on the interfacing requirements for each component. For example, three switches from three different manufacturers or models may require three separate network agents, one agent specifically configured to interface to one of the switches. In a particular embodiment an agent can be implemented as device management software incorporated in the storage service manager 102. For example, it might be practical to use a conventional IP network agent and an FC network agent as a network agent, and to use vendor specific storage management tools as a storage agent. Alternatively, an agent component can be a standalone computer, e.g., a PC suitably interfaced to its associated device (host, switch, data store) and running appropriate control software. Consequently, the block diagram elements for the agents illustrated in FIG. 1 represent some combination of software and/or hardware components. In a particular implementation, agent software components can be installed on the system components directly.

Figure 2:
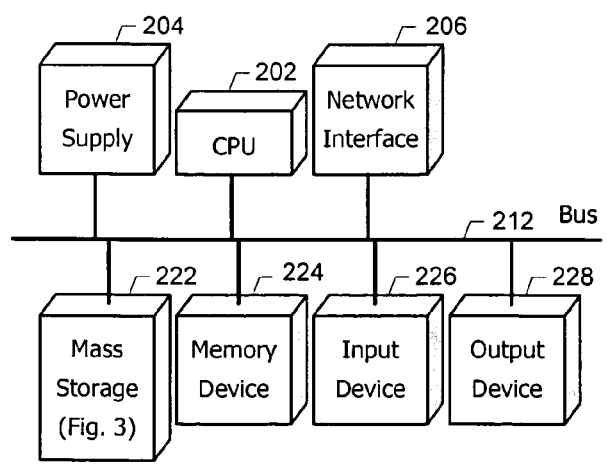
FIG. 2 is a schematic illustration of a hardware exemplar of the storage service manager of the present invention.

FIG. 2 shows a generalized block diagram of the hardware architecture of the storage service manager 102. In a typical embodiment of this aspect of the invention, the network agent comprises a conventional computer system architecture. A processing device 202 (e.g., a CPU) provides the computing engine for performing the various tasks of the network agent. A common bus 212 provides a data path for data communication between the processing device and other components which comprise the network agent. The common bus can also include the cabling to provide power from a power supply 204 to the other devices. A network interface component 206 provides a suitable network connection to the host components 104, communication components 106, and data storage components 108 which comprise the network 100 to be managed.

A mass storage component 222 serves as a data store to hold computer programs and various data needed for operation of the storage service manager 102 in accordance with the present invention. The functionality of the computer programs and the kind of data that is processed will be discussed in more detail below. A memory component 224 comprises some combination of random access memory (RAM), dynamic and static RAM, cache memory, non-volatile memory, flash memory, and so on. Input devices 226 might include user input devices such as a keyboard, mouse, etc. Output devices 228 might include monitors or the like, speakers for audio interfacing if appropriate, and so on.

It can be appreciated that many other suitable configurations are possible. For example, the storage service manager 102 can have a distributed architecture. A part of the storage service manager may be a diskless workstation accessing the mass storage over a network. In this case, the common bus 212 can represent a network connection.

In another embodiment, the processing device component 202 might represent a number of computing device components. For example, the processing device 202 might be a first computing device configured as a handheld device having some form of data connection (wired, wireless-radio, infrared, optical) to a second computing device configured as a server which is connected to the network 100 to provide remote access network management capability via the handheld device.

Figure 3:
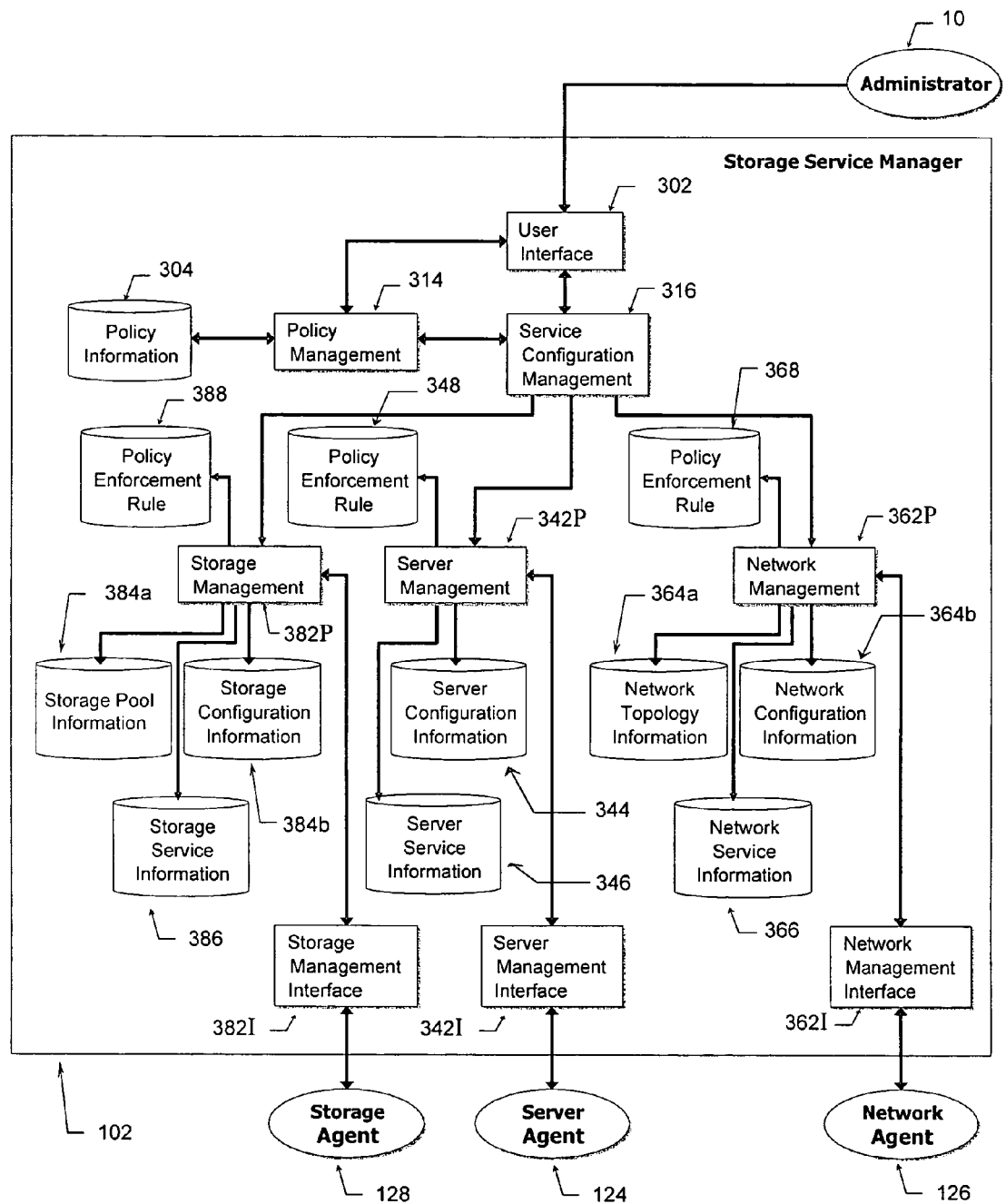
FIG. 3 shows an architectural block diagram representation of a software exemplar of the storage service manager of the present invention.

FIG. 3 shows a high-level functional block diagram of the architecture of the storage service manager 102. A suitable interface provides for communication between the storage service manager 102 and the constituent components of the network architecture 100, namely, host components 104, communication components 106, and data storage components 108, to perform device configuration as requested by the administrator. A user interface module 302 provides access to the storage service manager 102 for an administrator (user) 10. This can be a graphical user interface (GUI). This is a common interface and may be appropriate in many situations. However, under other circumstances, a command line interface (CLI) may be more suitable. Still other interfaces are contemplated. For example, instead of a conventional human user, the "user" may be a machine. The interface can be a physically separate device, e.g., a handheld unit that communicates wirelessly with the storage service manager.

A service configuration management module 316 receives input from the user interface 302 representative of the administrator's commands. This module invokes the other constituent modules which comprise the storage service manager 102 that are needed to implement the administrator's commands. A policy management module 314 provides access to a policy information data store 304.

A server management module 342P, a network management module 362P, and a storage management module 382P, each contains the routines or procedures needed to control the configuration of the respective devices according to the administrator's commands. For example, the server management module 342P can issue requests to a device (e.g., host bus adapter) on a host machine to configure the device. Similarly, the network management module 362P can interact with the various switching components that comprise the network to implement the administrator configuration commands. The storage management module 382P interacts with the various storage components to provide the storage capacity and characteristics required by the administrator.

A communication interface is provided for each of the agents. These interfaces 342I, 362I, and 382I represent any interface (e.g., fiber channel, SCSI, ATA, and so on) that is suitable for a given device. Typically, communication occurs via standard network protocols such as TCP/IP, HTTP, LDAP and so on. These functional modules can be implemented using any conventional combination of hardware and software. In any given particular implementation, these modules can comprise one or more components. For example, different components may be needed for communicating with equipment from different manufacturers. Custom components may be needed, for example, if a vendor provides a proprietary configuration port.

FIG. 4 shows the data comprising policy information stored in the policy information data store 304 of FIG. 3. This information is defined by the administrator, and it constitutes the range of capacity and performance characteristics of different storage path configurations that are deemed appropriate for the storage facility that is being managed. For example, a commercial enterprise will likely implement policies for its internal storage needs that are different from the policies of a storage service provider. It can be appreciated therefore, that the information described herein may vary from one particular implementation to another. Moreover, the data structures shown in this figure and in the subsequent figures are a logical representation of the relevant information. Those of ordinary skill in the relevant art will appreciate that numerous implementation-specific designs for storing and accessing the data are possible.

A service policy information table 402 describes the various storage path configuration policy levels that are defined for the system. Each service policy level is identified by a policy ID. These policies are defined by the administrator and represent the storage access policies of the storage service facility. Every user who desires a particular storage path configuration will be allocated the appropriate resources according to the service policy desired by the user. The service policies typically are pre-defined policies. For example, a storage server provider may define various levels of storage path configuration and "sell" those storage path configurations to users. New policies can be defined if a desired storage path configuration is not already defined.

A service policy comprises three sub-policies: a storage sub-policy, a network sub-policy, and a server sub-policy. According to the present invention, each service policy is associated with a set of storage sub-policies, a set of network sub-policies, and a set of server sub-policies. Thus, as can be seen in FIG. 4, the service policy information table 402 includes a "pointer" field or some other indexing information to each of respective sub-policy tables, 404, 406, and 408. Having multiple sub-policies allows the administrator to perform tradeoffs among storage, network, and server resources for a given service policy. For example, for a given service policy, a first user might want higher capacity storage, but is willing to sacrifice network speed. A second user asking for the same service policy may be satisfied with lower capacity storage, but want higher network speed.

A storage path configuration policy table 404 defines different storage sub-policies. A policy ID field contains unique identifiers for each storage sub-policy. A storage security field indicates whether LUN (logical unit) masking is enabled (ON) or not (OFF). In a particular embodiment of the invention, the storage devices use the RAID (redundant array of inexpensive disks) architecture. A RAID level field serves to define the RAID level for a particular storage sub-policy. A cache field specifies the size (typically in MBytes) of storage space for the particular storage sub-policy. A port priority field is a ranking parameter which specifies the priority to prioritize the specific network transferred on the network port. A disk speed (units of RPM) represents the speed of the disk drive corresponding to a particular storage sub-policy. A storage pool field is a parameter which specifies a disk group that is pooled for a specific purpose. For example, a "financial" pool can be created for the subsequent use of a financial database application. The storage pool field is a pointer or other suitable index into a storage pool information table 384a discussed below in FIG. 5.

A network configuration policy table 406 defines the network sub-policies. Each network sub-policy is uniquely identified by a policy identifier stored in a policy ID field. A network security field specifies whether a network security function (e.g., WWN zoning or VLAN) is being applied (ON) or not (OFF). A bandwidth field specifies the total bandwidth applied to the network path. A "num of path" field specifies the number of network paths for accessing the storage.

The server sub-policies are stored in a server configuration policy table 408. Each sub-policy is identified by a unique policy identifier stored in a policy field. Computer resources are specified by a CPU field, a memory field, and a processor field. The CPU field can specify the percentage of CPU utilization allowed for a given policy. Thus, a user can be given up to 60% of the CPU time for sub-policy "Policy0001." The memory field, likewise, specifies the memory utilization that is permitted for a given sub-policy. The processors field specifies the number of parallel processors (if available) to be used for a particular application. A platform field specifies a particular server platform. The information in this field determines the storage disk format.

FIG. 5 shows the data comprising information stored in the storage pool information data store 384a of FIG. 3. In a particular embodiment of the invention, storage resources can be managed in groups that are determined by its usage. For example, a "financial pool" can be created for the use of financial database application service. A "logical" storage pool comprises of a set of LDEVs (logical devices). An LDEV is also a "logical" part of "physical" disk group. The disk group comprises a set of hard disk drives.

Figure 5A:
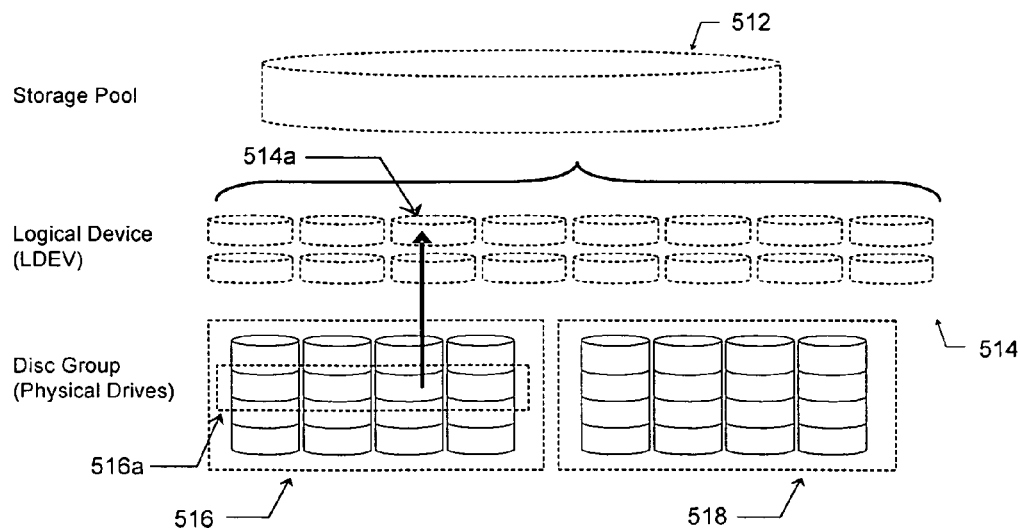
FIG. 5A illustrates a RAID example of a storage pool.

Referring for a moment to FIG. 5A, an implementation of a RAID volume is shown to illustrate this aspect of the invention. The figures shows the implementation of a storage pool 512 using RAID arrays 516 and 518. The physical disks of the RAID arrays define a set of logical devices 514 which collectively define the storage pool. A group of disks 516a in RAID array 516 defines a logical device 514a.

Returning now to FIG. 5, a storage pool information table 502 defines the storage pools that are available for allocation, according to a specific storage access policy. A pool ID field stores unique identifiers for the different storage pools. A total capacity field indicates the storage capacity for a given storage pool. A free capacity field indicates the amount of free space in the storage pool. An LDEV field points or otherwise identifies a logical device information table 504. This table defines the logical devices that comprise the storage pool.

The logical device information table 504 includes an ID field to uniquely identify each logical device (LDEV) which constitutes a storage pool. A capacity field specifies the total storage capacity of each logical device. A consumed field is a boolean type of parameter which specifies YES (TRUE, etc.) if the LDEV is allocated to the host. The free capacity value can be computed by subtracting the capacity of all of the allocated (consumed) LDEVs from the total capacity. A disk group field stores the identifiers of the physical disk groups (e.g., in a RAID array) that comprise the logical device.

A disk group information table 506 describes each of the physical disk groups. A disk group ID field contains an identifier for each disk group. A RAID level field indicates the RAID level at which the physical disk group is operating. A capacity field indicates the total storage capacity of an LDEV. A "num of LDEVs" field indicates the number of logical devices defined by the physical disk group. A disk speed (units of RPM) specifies the rotational speed of the physical disks in the physical disk group. A format field specifies the formatting of a disk; for example, the disk can be formatted for NTFS in the case of UNIX-based OSs, or S/390 in the case of mainframes.

FIG. 6 shows the data comprising information stored in the storage path configuration information data store 384b of FIG. 3. The use of storage can be determined based on the network port information to be assigned, the allocated cache memory size, and the volume information contained in the storage path configuration table 602. Each storage device can be identified by information in the storage ID field. The ports field is a suitable pointer to a network ports sub-table 604. This sub-table identifies the ports that are assigned to the storage device. A cache field specifies the amount of cache memory used in the storage device for buffering the data being transferred to and from the storage device. A volume field is a pointer to a volume information sub-table 606. Each entry contains one or more pointers to an LDEV table 608, to identify the one or more LDEVs which comprise a LUN.

The network ports sub-table 604 comprises the port IDs that are assigned to a storage service. This table includes a bandwidth capacity field that indicates the total bandwidth capacity for each port. An assigned bandwidth field indicates the total current bandwidth that has been assigned (allocated) to the port. Each storage path configuration that is assigned to a port is also allocated a certain bandwidth on the assigned port. This "assigned bandwidth" field shows the total bandwidth for a port that has been allocated to all storage path configurations using that port. It is noted that there are situations where multiple ports can be assigned to a single storage volume. Also, a single network port can be shared by multiple storage volumes.

The volume information sub-table 606 comprising data storage information. A volume can be created with either a LUN or a list of LDEVs. In case of the OPEN system, a volume corresponds to a LUN that in turn comprises a set of LDEVs. In that case, the table entry points to the list of constituent LDEVs. For example, the volume LUN00A0 comprises two LDEVs. Consequently, a suitable pointer data mechanism is provided (e.g., linked list, or the like) point to the constituent LDEVs. It is noted that the capacity size of a LUN can be calculated as the sum of the size of LDEVs.

FIG. 7 shows the data comprising information stored in the storage service information data store 386 of FIG. 3. As mentioned above, a storage service is one of three components which comprise a storage path configuration; the other two components are a server service and a network service, which will be discussed below. A storage service is a set of reserved storage-related resources that can be allocated to a requested storage path configuration. A storage device table 702 identifies storage services defined by the administrator. Each storage service is identified by an identifier contained in a service ID field. A storage ID field identifies the storage device in the storage path configuration information data store 602. A cache field indicates the total cache memory size reserved for the given storage service. A pointer structure is provided for each storage service to point to one or more entries in a storage port table 704. This identifies the port(s) associated with a given storage service.

The storage ports table 704 includes, a storage worldwide name (WWN) port field which stores the WWN designation of the port. The WWN is an IEEE specification that provides world wide, unique identification of fabric devices. A port ID field identifies an entry in the network ports sub-table 604 to provide information for each port associated with a storage service. A bandwidth field indicates the assigned bandwidth for a given storage service. Each port is associated with a LUN. Thus, each entry in the storage port table 704 includes a pointer to a LUN table 706 that identifies a LUN. Each entry in the LUN table includes a LUN identifier in the volume information sub-table 606. Each LUN is associated with one or more entries in a host port WWN table 708. The host port WWN lists the WWN designation of each HBA on the host.

Figure 8:
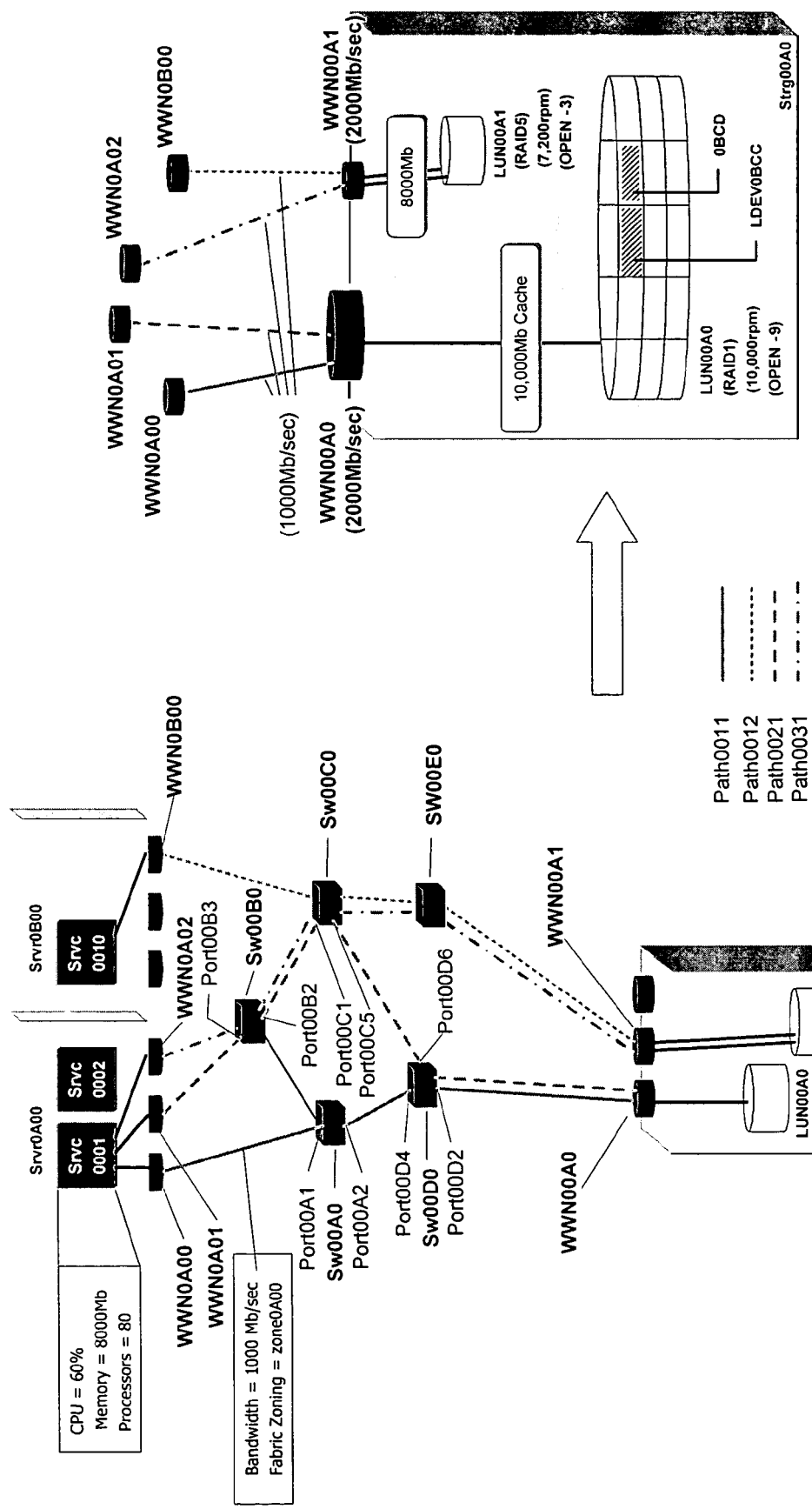
FIG. 8 illustrates a configuration represented by the storage service information shown in FIG. 7.

FIG. 8 shows the storage services defined in FIG. 7. For example, the storage service Srvc0001 provides access to the storage device Strg00A0, as shown in the storage device table 702. Tracing through the storage port table 704 and the LUN table 706 to the host port WWN table, it can be seen in FIG. 8 that storage service Srvc0001 provides access to storage device Strg00A0 via three host ports, namely, WWN0A00, WWN0A01 and WWN0A02. The storage service also provides access via the storage ports WWN00A0 and WWN00A1. It is noted, that storage service in accordance with the present invention provides access to specific LUNs defined in the storage device. As the LUN table 706 indicates, and as shown in FIG. 8, the storage service Srvc0001 provides access to LUN00A0 and LUN00A1. The present invention allows the administrator to reach a LUN from a server host seamlessly without individual device management operation.

FIG. 9 shows the data comprising information stored in the server configuration information data store 344 of FIG. 3. A server host computer configures its resource consumption of network bandwidth and processor power. Within a fiber channel network, for example, a server computer is equipped with one or more host bus adapters (HBAs). An HBA is a network interface for fiber channel platform. As indicated above, each HBA is associated with a World Wide Name (WWN) designation as an identifier. Each server is identified by a server ID and stored in the server ID field of a server table 902. A platform field indicates the underlying operating system. A ports field points to a host port table 904 which lists each host port for the given server. Each host port in the host port table is associated with a WWN designation in the host port field. A bandwidth field in the host port table specifies the bandwidth of the host port. A memory field in the server table 902 specifies the amount of memory contained in the server. A processors field points to a processor table 906 that lists identifiers of the processors which comprise the given server.

FIG. 10 shows the data comprising information stored in the server service information data store 346 of FIG. 3. Recall, that a storage path configuration comprises three components: a storage service (discussed above), a server service, and a network service (which will be discussed below). The server service represents the component of a storage path configuration relating to the computing resources of a server host. A server service can be provided either by a single server host computer or by multiple server host computers.

FIG. 10 illustrates a case where one server (Srvr0A00) supports two services. However, there can be a case that multiple servers (Srvr0A00 and Srvr0B00) are assigned to provide a single service (Srvc0001). This illustrates an aspect of the present invention wherein logical computer resources can be allocated to several server services.

A server service table 1002 maintains the server services that have been defined by the administrator and which can be allocated as a components of storage path configurations. A service ID field identifies each server service. A server ID field identifies each server in the network, and relates to the server table 902. A memory field indicates the amount of memory (MB) reserved to a given server service. A CPU share field indicates the CPU processing capacity (as a percentage of the total CPU capacity) allocated to a given server service. A num of processors field indicates the number of processors allocated to a given server service. An assigned processors field points to a processor table 1004 that identifies a list of processor IDs of processors allocated to a given server service. A num of ports field indicates the number of ports assigned to a given server service. An assigned ports field is a pointer to a list 1006 of host port IDs. As noted above, network ports can be identified by a WWN designation on a fiber channel network.

FIG. 11 shows the data comprising information stored in the network topology information data store 364a of FIG. 3. A network topology map can be represented by a combination of a source object 1112 having a node ID 1102 and a port ID 1104, and a destination object 1114 also having a node ID 1106 and a port ID 1108. A "node" refers to a particular component object such as a host 102, a switch 104, or a data storage component 108. It is noted that a host can be logically comprised of two or more nodes, each having its own ID. Similarly, a switch can be logically viewed as having two or more nodes, and a similar possibility exists for the data storage components. The node ID can be some arbitrarily assigned identifier.

The port ID can be an arbitrarily assigned identifier. Alternatively, the port ID can be a World Wide Name in the case of a fibre channel port to which the node is connected. In an IP environment, the port ID can include the MAC address or a combination of an IP address and an IP subnet mask. It can be appreciated that a node can have more than one port.

Hosts 102 and switches 106 can be categorized as source objects 1112. Data store 108 and again switches can be characterized as destination objects 1114. This characterization is determined from the point of view of data flowing downstream from host to data store. The data flow is merely an adopted convention. A reverse view can be adopted as well, where the data store is a starting point and the host is the end point. Either view, can serve to represent the topology of the network. It can be appreciated that still other conventions can be employed to represent the network topology.

FIG. 12 shows the data comprising information stored in the network configuration information data store 364b of FIG. 3. A network devices table 1202 identifies each network by an identifier in a network ID field. A type field indicates the network platform. A security field indicates the type of security function provided by a given network. A device objects field lists the devices comprising the network in a devices table 1204, each device being identified in an object ID field.

FIG. 13 shows the data comprising information stored in the network services information data store 364b of FIG. 3. As mentioned above, a network service is a component of a storage path configuration, the other components being a storage service and a server service, both of which have been discussed above. The network service consists of one or more network paths that connect a server host and a storage device. A network table 1302 identifies each network service in a service ID field. A path ID identifies, for a given network service, a network path between a port in the server (host) and a port on a storage device. A host port field identifies the host port to which a given path is "connected," or otherwise in data communication. A storage port field identifies the storage port to which a given path is "connected" or otherwise in data communication. A zone ID field is provided in the case of a fibre channel network path, and identifies different zones in a multi-zone configuration. It can be appreciated of course that other security implementations on other network platforms can be accommodated. A bandwidth field indicates the bandwidth for a given path. An objects field is a pointer to an objects table 1304, which identifies the network objects that constitute a given path.

The objects table 1304 includes a switch ID field which identifies a constituent switch object for the given path. An inport ID field and outport ID field identify the respective in and out ports to which the given path is connected. Conventionally, the inport and outport are defined relative to a direction from the storage device port to the host (server) port. The tables shown in FIG. 13 represent the configuration shown in FIG. 8.

Figure 14:
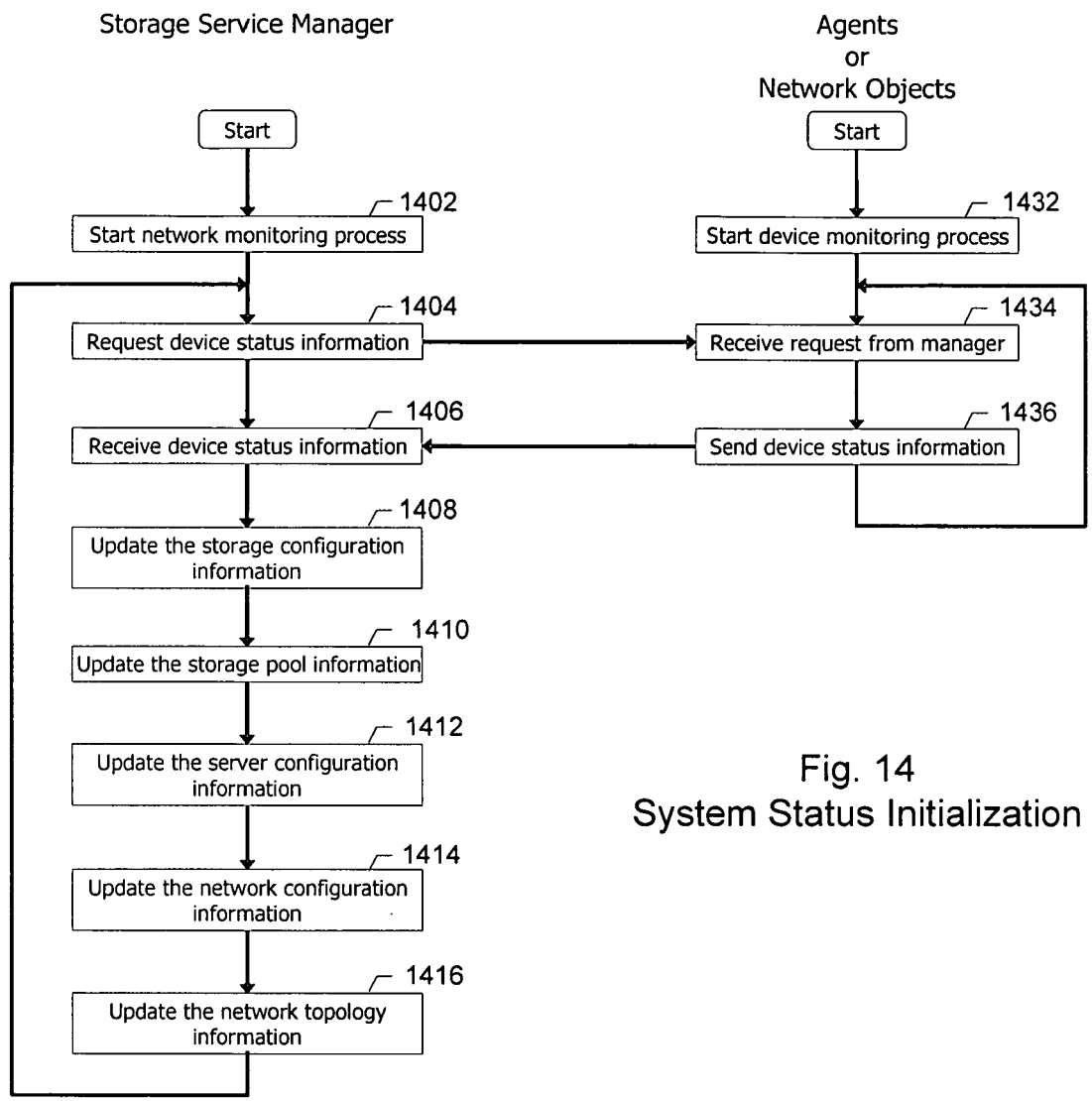
FIG. 14 is a high level flow diagram highlighting system status initialization in accordance with an illustrative embodiment of the present invention.

FIG. 14 is a high level flow diagram highlighting the main process steps for initializing device configuration information in the storage service manager 102. When the storage service manager boots up or otherwise begins processing, in a step 1402, it first has to discover it universe of network objects (servers, switch elements, storage components) in order to initialize the device configuration status. Referring for a moment to FIG. 1, the storage service manager 102 is shown accessing and/or controlling network objects through the agents, namely, the server agents 124, the network agents 126, and the storage agents. However, it can be appreciated, in another implementation, that the storage service manager 102 can be configured to communicate with the network objects directly via vendor dependent communication methods; e.g., switch vendors typically provide their own administration software to access their equipment, similarly for large storage components. It can be appreciated for those cases, that the storage service manager 102 can be configured to interact with the vendor software, via a machine interface (if available), or simply by emulating a human user.

At a step 1404, the storage service manager 102 sends request messages to the agents to discover the network objects. Alternatively, where vendor access software is provided, the storage service manager can interact with the software to obtain the information. At steps 1432 and 1434, each agent (or the vendor provided software) receives a message that request device information. Each agent or vendor software retrieves the information and returns one or a series of messages that contains the requested device configuration status information, step 1436. The communication can use standard protocols, such as SNMP, HTTP, and so on; CIM (Common Information Model) is a good example for transferring message data in the standard data model. From steps 1408 to 1416, the storage service manager 102 updates the various local information repositories according to the device configuration information received at step 1406. As an observation, if at step 1406, the storage pool is not defined by the storage agent, the storage service manager 102 can allocate storage resources to define one or more storage pools as needed.

Figure 15:
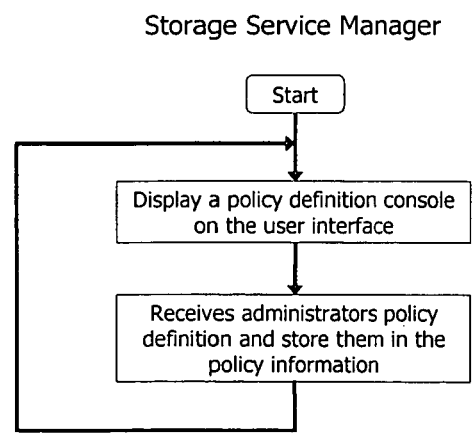
FIG. 15 is a high level flow diagram showing a policy definition process.

FIG. 15 shows the basic steps for defining, modifying, or otherwise managing the policy information. This is a task for the administrator of the storage service management system.

A suitable presentation of the policy information contained in the policy information data store 304 is made to the administrator. Typically, this is a GUI based presentation. The administrator can then navigate through the different policies, create new policies, delete policies, modify policies, and so on. These changes are then reflected back to the policy information data store. For example, the administrator may define one or more policies for financial applications.

FIG. 16 shows a high level process flow for handling a storage path configuration setup request. When a user has a need for storage, she will make a request to the administrator for a storage path configuration. The administrator will then access the storage service manager 102 to allocate the resources (e.g., server component, network component, and storage component) to provide the storage path configuration being requested. A display is presented, in a step 1602, to the administrator in a suitable interface. In a step 1622, the administrator selects a service configuration policy according to the requested level of service. For example, the administrator may choose a "financial application service" policy for the purpose of creating a service for financial use. As another example, a "Gold service" policy might be defined for customers who are willing to pay a premium for high speed and/or high capacity storage access.

In a step 1604, the policy management program 314 on the storage service manager 102 loads the policy information (FIG. 4) that is requested by an administrator. At a step 1624, the administrator specifies a storage capacity size to be allocated from the storage pools. A set of storage pool identifiers which identify the storage devices which satisfy the requested capacity are determined and stored in memory, in step a 1606. At a step 1626, the administrator selects one or more servers from which the user can access her storage. The server IDs of the selected severs are stored in memory, in a step 1608. Then, in a step 1610, the storage service manager 102 starts a process to allocate resources as requested. This includes initiating processing in the storage management module 382P, the server management module 342P, and the network management module 362P to allocate the necessary components of the requested storage path configuration. Processing in each of these modules is discussed respectively in connection with FIGS. 17, 18, and 19.

Recall that a storage path configuration comprises three components: a storage service, a server service, and a network service. FIG. 17 is a generalized flow diagram highlighting the major steps for allocating a storage service component for a requested storage path configuration. At steps 1702 and 1704, the storage management module 382P looks up a policy enforcement rule to calculate actual parameter values to enforce on the storage device. The storage path configuration policy 404 shown in FIG. 4 includes some parameters that are defined by an administrator. For example, if security is ON, the storage management module has to decide a security type to apply. Thus, an aspect of the invention is the use of "rules" as the basis for identifying performance requirements and security requirements for a given policy. By comparison, a pure policy-based determinations involve identifying a set of policies, and simply associating desired performance and security criteria for each policy. Rule-based determination involves a more heuristic approach, where decisions are based on execution of the rule to evaluate the logic and/or computations comprising the rule.

FIG. 17A shows a typical rule that can be applied to a security function that might be implemented on a LUN. For the rule exemplar shown in FIG. 17A, the security function is provided in a line of storage systems (Freedom Storage series) manufactured and sold by the Assignee of the present invention and is referred to as "LUN masking." The illustrated rule limits storage accesses only from permitted host WWNs. Referring to FIG. 4, the "storage security" field in the storage configuration policy table 404 can be tested as a flag in an "enforcement rule" using a logic statement.

FIG. 17B shows a code fragment for converting a rank parameter into an actual bandwidth parameter. This figure illustrates that a rule can be a computation. In this particular implementation of the invention, port priority is set by its rank. This facilitates the administration function. However, port priority may have to be assigned based on a maximum bandwidth (MB/sec); for example, the "access priority" function used in the Freedom Storage series sets a maximum bandwidth on a network port. This function can limit the maximum bandwidth that can be consumed by traffic from one network port on the storage to one host WWN. The use of a rule in this situation allows a translation of one parameter ("port priority") to another parameter ("bandwidth") which can be used to select a port based on bandwidth.

After an administrator inputs a policy and a capacity size, the storage service manager 102 can automatically determine the storage LDEVs to assign. For example, suppose "disk speed" is set to '10000' in the policy and a '20000' Mb capacity is requested for storage pool 'Pool0010'. The storage service manager refers the storage pool information tables in FIG. 5 and checks the 'free capacity' field for the storage pool identified as 'Pool0010'. It finds that the disk group DGRP1053 has '10,000' rpm drives. It searches the logical device information table 504 for free LDEVs. This is accomplished by checking the consumed field, which indicates whether the LDEV has been assigned to a storage path configuration. An LDEV selection rule, such as the rule illustrated by the code fragment of FIG. 17C, can be used.

At a step 1706, the storage service manager 102 sends a request to a storage agent 128 to create a new volume or to expand an existing volume. The request message contains a storage ID, LDEV list, and a port ID to assign.

At step 1722, the storage agent 128 for the storage device identified by the storage ID creates a new volume as requested. The storage agent returns the storage port WWN.

At a step 1708, the storage service manager 102 makes a requests to apply a security measure according to a security policy if there is one associated with the requested storage path configuration. Referring again to FIG. 4, the service policy for a given storage path configuration may be associated with a security policy for storage devices, or the user may explicitly request a particular security policy for her storage path configuration. This request is sent to the storage agent to implement the requested security measure. Thus, at a step 1724, the storage agent 128 applies the requested storage security. For example, in Freedom Storage, a storage security function can restrict storage access to permit access only from the host port WWN.

At a step 1710, the storage service manager 102 can make a request for a port access priority control. The request is sent to the storage agent 128, wherein at a step 1724, the storage agent applies an access bandwidth on the network port that reserves bandwidth for traffic from a host WWN to the storage LUN.

At a step 1712, the storage service manager 102 requests a cache memory size for the requested storage path configuration. The request is sent to the storage agent which, in a step 1728, configures a cache of appropriate size in the storage device(s). At a step 1730, configuration status information can be sent to the storage service manager 102 to confirm all of the settings. Finally, at a step 1714, the storage service manager 102 updates the storage path configuration information data store 384b, the storage service information data store 386, and the storage pool information data store 384a with the information obtained above.

FIG. 18 is a generalized flow diagram highlighting the major steps for allocating a server service component for the requested storage path configuration. In a step 1802, the storage service manager 102 calculates server computing resources that are defined by the policy. The CPU share and processor IDs are determined as satisfying the service level. Network bandwidth may be guaranteed if the port priority on the storage port is clear. The storage service manager 102 chooses a network port on the server that has the necessary bandwidth capacity to satisfy the bandwidth guaranteed on the storage. Consider the network example of FIG. 8, in which the storage ports have a 2,000 Mb/sec bandwidth. In this case, at least two 1,000 Mb/sec network ports on the server must be assigned to provide a 2,000 Mb/sec bandwidth.

At a step 1804, the various objects in the server are selected, including desired processors, network ports on the servers (e.g., HBA ports), and memory size. At a step 1806, the storage service manager 102 sends a request to a server agent 124 to allocate suitable host ports. The request message contains a server ID and a processor list.

At step 1822, the server agent 124 identifies the requested processor resources as being allocated. At a step 1808, the storage service manager 102 makes a request to allocate the network ports on the servers. This request is sent to the server agent 124, at a step 1824, which marks the specified network ports as being allocated.

At a step 1810, the storage service manager 102 can make a request for a desired memory size. This specifies the amount of memory to be allocated to handle the requested storage path configuration. The request is sent to the server agent 124, wherein at a step 1826, the memory allocation is noted.

At a step 1812, the storage service manager 102 updates the server configuration information data store 344 and the server service information data store 386 with the information obtained above.

FIG. 19 is a generalized flow diagram highlighting the major steps for allocating a network service component for the requested storage path configuration. In a step 1902, the storage service manager 102 calculates the configuration parameters in accordance with the policy associated with the storage path configuration; for example, the number of paths to create. At a step 1904, the storage service manager calculates a network route, comprising a list of network objects, from the server to the storage.

At a step 1906, the storage service manager 102 sends a request to one or more network agents 126 to set the path on the network, including any requested security capability. Referring again to FIG. 4, the service policy for a given storage path configuration may be associated with a security policy for the network path, or the user may explicitly request a particular security policy for her storage path configuration. The request message contains a switch ID (a switch to set the path), an inport ID (an ingress port on the switch), an outport ID (an egress port on the switch), and a zone ID if security is desired. At step 1922, the network agent(s) 126 sets the path on the switch as requested in step 1904. At a step 1908, the storage service manager 102 makes a bandwidth reservation request using the path ID determined in step 1906 to allocate the desired bandwidth for the path. This request is sent to the network agent(s) 126, which at a step 1924, controls the switch to guarantee the bandwidth on the path as requested.

At a step 1910, the storage service manager 102 updates the network configuration information data store 364*b*, the network service information data store 366 with the information obtained above.

Figure 20:
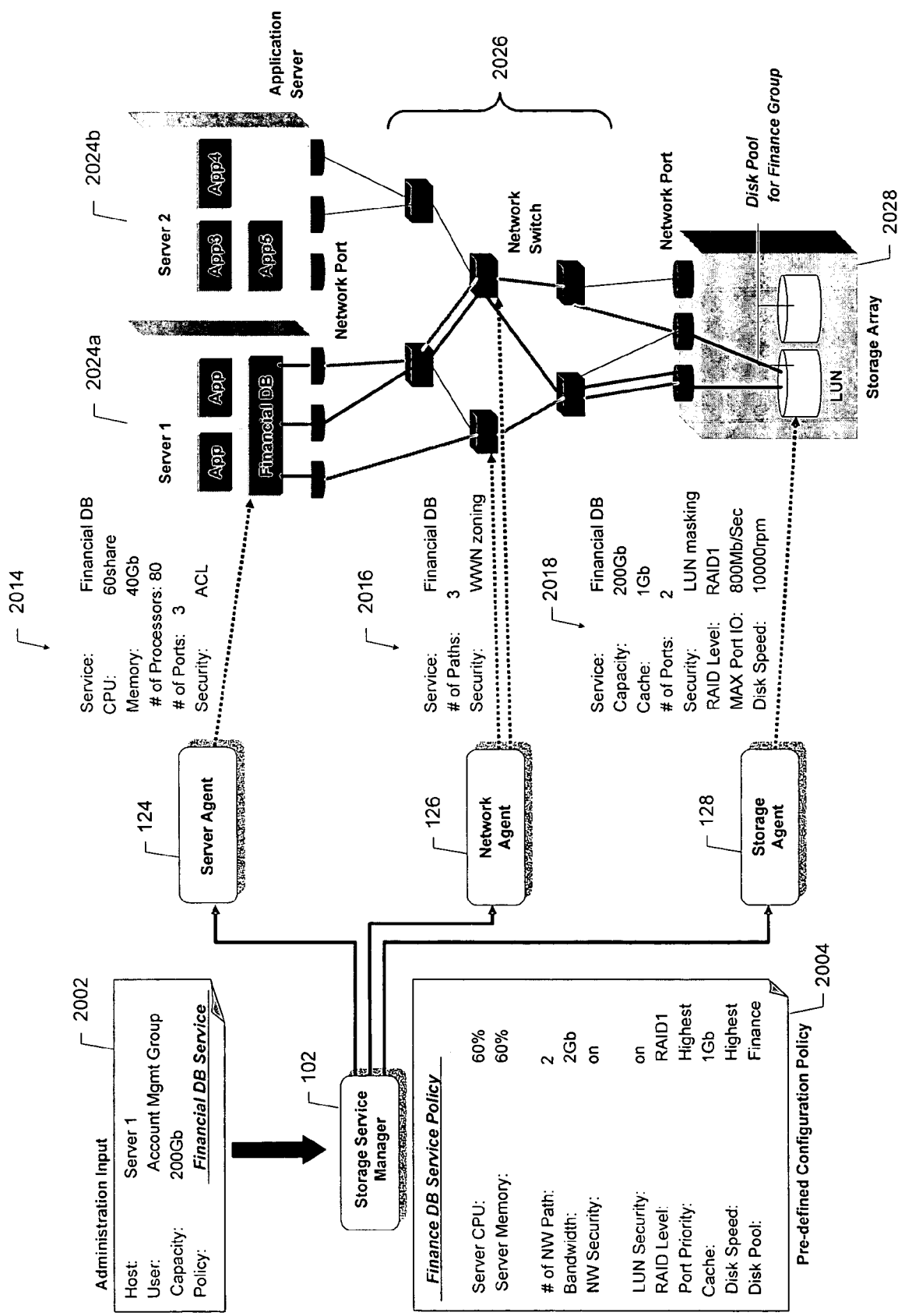
FIG. 20 shows an example of storage path configuration allocation at the system architecture level.
Figure 20A:
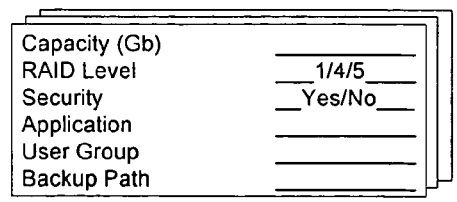
FIG. 20A shows an alternative set of abstract information for specifying a storage path configuration.

FIG. 20 is a high level illustrative example of a storage path configuration scenario. In response to a user request for storage service, an administrator will enter her administration input 2002 to setup the requested storage path configuration (FIG. 17). An aspect of the present invention is that the administrator can specify a storage path configuration in terms of abstract characteristics of the desired configuration, such as capacity and access policy shown in FIG. 20. FIG. 20A shows an alternative set of inputs to emphasize that other kinds of abstract characterizations can be provided by an administrator. The illustrative example of FIG. 20A shows the administrator can specify characteristics such as a RAID level, a security parameter, an application (database application, for example), and so on.

Returning to FIG. 20, the selected service policy in this example is for "Financial DB Service." This abstract characterization, as can be seen in the figure, represents a pre-defined configuration 2004. Based on the selected service policy, the server agent 124 allocates a suitable server service 2024*a* based on parameters 2014 of the server service component of the storage path configuration. Similarly, the network agent 126 allocates a suitable network service component 2026 based on parameters 2016 of the network service component. The network service component parameters are based on the selected service policy 2004. The storage service component 2028 is allocated by the storage agent 128 based on parameters 2108 of the storage service component, which in turn are based on the selected service policy. Recall, that an aspect of the present invention is the allocation of an internal data path within the data storage components 108 (FIG. 1) to a specific physical device, or devices. For example, the data path may lead to a logical unit comprising a plurality of physical devices that are logically organized as a single volume.

Figure 21:
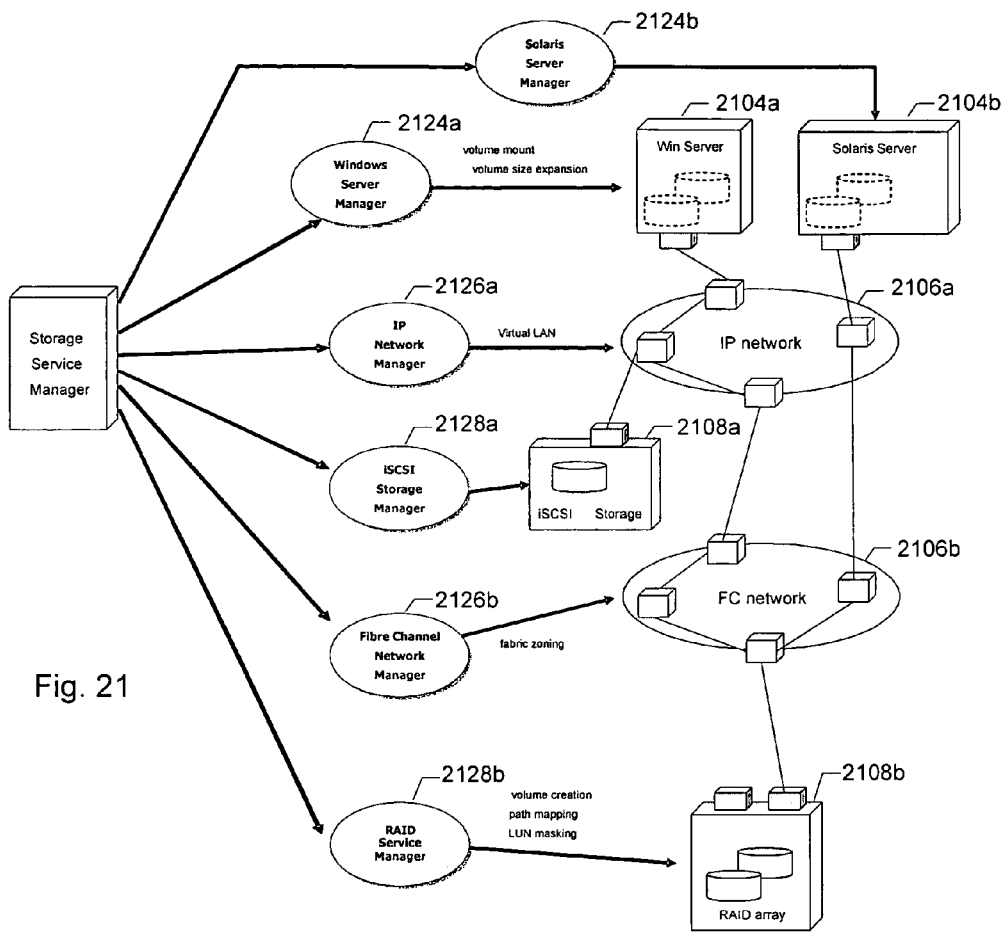
FIG. 21 illustrates a heterogeneous architecture adapted with a storage network management in accordance with an embodiment of the present invention.

FIG. 21 illustrates the adaptability of the storage service manager 102 of the present invention. The figure illustrates a heterogeneous operating environment. At the host end, the storage service manager may be faced with a plurality of server architectures. The configuration exemplar shown in the figure illustrates a Microsoft Win server 2104*a* and a Sun Microsystems Solaris server 2104*b*. Generally, different host architectures may provide widely varying capabilities and very different interfaces for system configuration, even for common administrative functions. Consequently, the server agent (e.g., 124*a*, FIG. 1) component may comprise a customized server agent for each such host, as shown in the figure (and also in FIG. 1). For example, one such server agent might be a Win server manager 2124*a* that facilities volume mounting and volume size expansion. Another server agent might be a Solaris server manager 2124*b* to provide similar capability and other configuration options.

Figure 22:
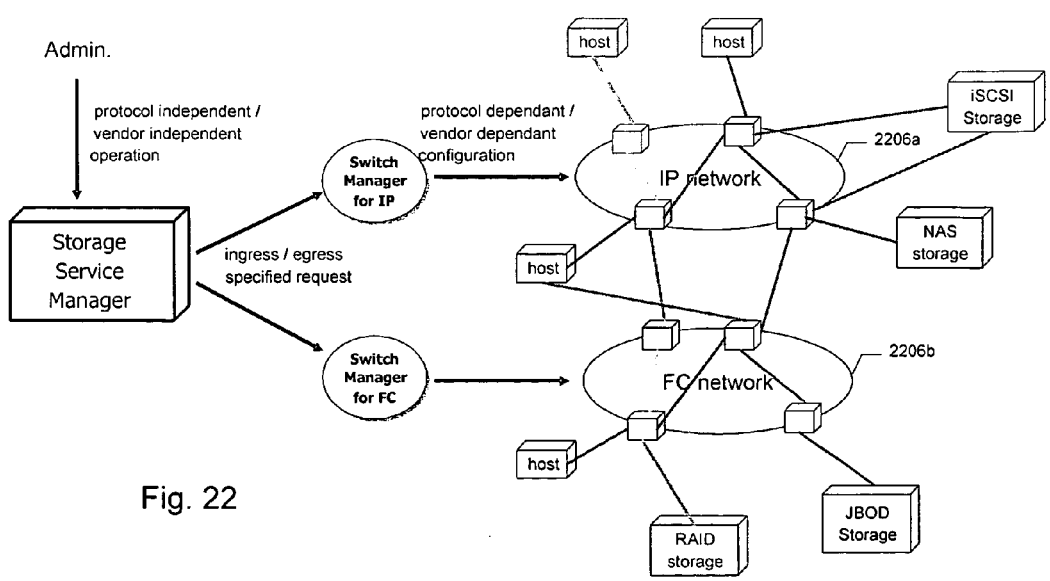
FIG. 22 shows a configuration exemplar of switches comprising a IP network and an FC network.

Turning to FIG. 22 for a moment, it can be seen that host servers and storage devices can be located throughout the network. The arrangement need not be purely hierarchical as shown in the configuration of FIG. 21. In FIG. 22, it can be seen that host servers can be connected to each switch 2206*a*, 2206*b*. Different storage devices can be connected to each switch. For example, an iSCSI storage device and a NAS storage facility can be accessed over the IP network 2206*a*. A RAID storage system and a JBOD storage path configuration can be accessed over the FC network 2206*b*. Any of the hosts can access any of the storage units. The storage service manager 102 (FIG. 1) of the present invention can allocate storage path configuration using the configuration information stored in the various repositories shown in FIG. 3. The method and apparatus to maintain a consistent path through IP network and fiber channel network is discussed in more detail in U.S. patent application Ser. No. 09/841,710.

FIG. 21 further shows that the switching fabric can comprise plural switch architectures. As shown the figure, switches are provided for an IP network 2106*a* and an FC network 2106*b*. Again, each switch architecture may have its own network agent to interface with the respective switch. For example, a switch in an IP network agent 2126*a* may provide virtual LAN capability that can configured and maintained by the corresponding network agent. Fabric zoning in a switch comprising the FC network can be exploited to facilitate implementation of security policies by a FC manager 2126*b*. In fact, it is possible that different manufactures of the same switch type will have different interfaces for administration. The network agent component 126 (FIG. 1) in that case may comprise a separate network agent component to properly interface with each switch type.

Similarly, a storage agent can be provided for each storage component. For example, FIG. 21 shows an iSCSI storage device 2108*a* and a RAID array 2108*b*. Each storage architecture has its respective storage agent (2128*a*, 2128*b*) to access the storage path configuration capabilities of each architecture. For example, a RAID manager 2128*b* can support volume creation, path mapping, and LUN masking.

What is claimed is:

1. A storage access method in a network data processing system comprising one or more host servers, a switching component, and a data storage component, the storage access method comprising:

receiving a user-originated request for data storage, the request including a service policy, the service policy comprising a server sub-policy, a network sub-policy, and a storage sub-policy which is associated with one or more data storage performance criteria;

identifying a server service component based on the server sub-policy;

identifying a data store from among a pool of data stores defined in the data storage component, wherein the identifying of the data store from among the pool of data stores includes selecting a data store having performance characteristics that meet or exceed the one or more performance criteria associated with the storage sub-policy;

identifying a port on the data store by applying a rule to the one or more data storage performance criteria, wherein the rule characterizes each port of a set of at least one port on the data store with a bandwidth metric, the bandwidth metric for each port being determined from a port priority and a total bandwidth of each port;

communicating with a data storage agent to establish a data path within the data storage component for data communication between the port and the data store, the data storage agent being one of a plurality of data storage agents that manage portions of the data storage component;

based on the network sub-policy, identifying a network path for data communication between the server service component and the port, wherein the network sub-policy includes one or more network path criteria for selecting a network path from a set of one or more network paths based upon one or more network attributes; and communicating with a network agent to allocate the network path identified based upon the network sub-policy, the network agent being one of a plurality of network agents that manage portions of the network storage component.

2. The method of claim 1 wherein the network path has a bandwidth metric that is greater than or equal to the bandwidth metric of the port.

3. The method of claim 1 further comprising communicating with a host agent to allocate resources on the host server that is identified in the user-originated request, the host agent being one of a plurality of host agents that manage the one or more host servers.

4. The method of claim 1 wherein the service policy is further associated with one or more security criteria, wherein the step of identifying a network path includes applying a second rule to the one or more security criteria to determine one or more security parameters, wherein the network path is identified based on the one or more security parameters.

5. A storage service manager comprising a processing component and a memory component storing computer program code for execution by the processing component, the program code configured to operate the processing component to perform method steps of:

receiving a user-originated request for data storage, the request including a service policy, the service policy comprising a server sub-policy, a network sub-policy, and a storage sub-policy which is associated with one or more data storage performance criteria;

executing a rule to identify a suitable data store from among a pool of data stores defined in a data storage component, wherein the identifying of the data store from among the pool of data stores includes selecting a data store having performance characteristics that meet or exceed the one or more performance criteria associated with the storage sub-policy, the rule further comprising an evaluation of the one or more data storage performance criteria, including identifying a port based on the rule, wherein the rule characterizes each port of a set of at least one port on the data store with a bandwidth metric, the bandwidth metric for each port being determined from a port priority and a total bandwidth of each port;

communicating with a data storage agent to establish a data path within the data storage component for data communication between the port and the data store, the data storage agent being one of a plurality of data storage agents that manage portions of the data storage component;

based on the network sub-policy, identifying a network path for data communication between the server service component and the port, wherein the network sub-policy includes one or more network path criteria for selecting a network path from a set of one or more network paths based upon one or more network attributes; and communicating with a network agent to allocate the network path identified based upon the network sub-policy, the network agent being one of a plurality of network agents that manage portions of a network storage component.

6. The storage service manager of claim 5 wherein the network path is characterized by a bandwidth metric that is greater than or equal to the bandwidth metric of the port.

7. A storage access method in a networked data processing system comprising one or more host servers, a switching component, and a data storage component, the storage access method comprising:

receiving a user-originated request for data storage, the request including a service policy, the service policy comprising a server sub-policy, a network sub-policy which is associated with one or more security criteria, and a storage sub-policy which is associated with one or more data storage performance criteria;

identifying a server service component based on the server sub-policy;

identifying a data store from among a pool of data stores defined in the data storage component based on a first rule comprising an evaluation of the one or more data storage performance criteria, wherein the first rule selects a data store having performance characteristics that meet or exceed the one or more performance criteria associated with the storage sub-policy;

communicating with a data storage agent to establish a data path within the data storage component for data communication between the data store and a port on the data store, the data storage agent being one of a plurality of data storage agents that manage portions of the data storage component, wherein the data storage agent identifies a port on the data store by applying a rule to the one or more data storage performance criteria, wherein the rule characterizes each port of a set of at least one port on the data store with a bandwidth metric, the bandwidth metric for each port being determined from a port priority and a total bandwidth of each port;

identifying a network path for data communication between the server service component and the port, based on an evaluation of the one or more security criteria in the network sub-policy, wherein the network sub-policy includes one or more network path criteria for selecting a network path from a set of one or more network paths based upon one or more network attributes; and communicating with a network agent to allocate the network path identified based upon the network sub-policy, the network agent being one of a plurality of network agents that manage portions of the network storage component.

8. The method of claim 7 wherein the port is identified based on a bandwidth metric that is determined by evaluating the first rule and the network path is characterized by having a bandwidth metric that is greater than or equal to the bandwidth metric of the port.

9. Computer program code stored in a memory component in a network data processing system comprising one or more host servers, a switching component, and a data storage component, a storage service manager comprising a processing component, the computer program code for execution by the processing component, the computer program code configured to operate the processing component to perform method steps of:

receiving a user-originated request for data storage, the request including a service policy, the service policy comprising a server sub-policy, a network sub-policy which is associated with one or more security criteria, and a storage sub-policy which is associated with one or more data storage performance criteria;

identifying a server service component based on the server sub-policy;
identifying a data store from among a pool of data stores defined in the data storage component based on a first rule comprising an evaluation of the one or more data storage performance criteria, wherein the first rule selects a data store having performance characteristics that meet or exceed the one or more performance criteria associated with the storage sub-policy;
communicating with a data storage agent to establish a data path within the data storage component for data communication between the data store and a port on the data store, the data storage agent being one of a plurality of data storage agents that manage portions of the data storage component, wherein the data storage agent identifies a port on the data store by applying a rule to the one or more data storage performance criteria, wherein the rule characterizes each port of a set of at least one port on the data store with a bandwidth metric, the bandwidth metric for each port being determined from a port priority and a total bandwidth of each port;
identifying a network path for data communication between the server service component and the port, based on an evaluation of the one or more security criteria in the network sub-policy, wherein the network sub-policy includes one or more network path criteria for selecting a network path from a set of one or more network paths based upon one or more network attributes; and
communicating with a network agent to allocate the network path identified based upon the network sub-policy, the network agent being one of a plurality of network agents that manage portions of the network storage component.

10. The computer program of claim 9 wherein the at the least one security parameter includes one of a port zoning parameter and a WWN (world-wide name) zoning parameter.

11. The computer program of claim 9 further configured to operate the processing component to perform a method step of evaluating the first rule to produce a bandwidth metric, wherein the bandwidth metric is used to identify the port on the data store.

12. The computer program of claim 11 further configured to operate the processing component to perform a method step of evaluating the second rule to produce at least one security parameter, wherein the network path is identified based on the at least one security parameter.

13. The computer program of claim 12 wherein the at least one security parameter includes one of a port zoning parameter and a WWN (world-wide name) zoning parameter.

14. Computer program code stored in a memory component in a network data processing system comprising one or more host servers, a switching component, and a data storage component, the computer program code configured to operate a processor to perform steps of:
receiving a user-originated request for data storage, the request comprising a service policy, the service policy comprising a server sub-policy, a network sub-policy, and a storage sub-policy, wherein the service policy is associated with one or more security criteria;
identifying a server service component based on the server sub-policy;
identifying a data store from among a pool of data stores managed by the data storage component, wherein the identifying of the data store from among the pool of data stores includes selecting a data store having performance characteristics that meet or exceed the one or more performance criteria associated with the storage sub-policy;
identifying a port on the data store by applying a rule to one or more data storage performance criteria, wherein the computer program code characterizes each port of a set of at least one port on the data store with a bandwidth metric, the bandwidth metric for each port being determined from a port priority and a total bandwidth of each port;
communicating with one or more data agents to set up the data store and the port;
identifying a network path between the server service component and the port, based on an evaluation of the one or more security criteria in the network sub-policy, wherein the network sub-policy includes one or more network path criteria for selecting a network path from a set of one or more network paths based upon one or more network attributes; and
communicating with one or more network agents to configure the switching component to set up the network path identified based upon the network sub-policy,
wherein one or more of the steps of identifying include determining a security parameter from the one or more security criteria and performing the identifying step using the security parameter.

15. The computer program of claim 14 wherein the security parameter is a LUN masking parameter, wherein the data store is configured in accordance with the LUN masking parameter.

16. The computer program of claim 14 wherein the security parameter is a port zoning parameter, wherein the network path is set up in accordance with the port zoning parameter.

17. The computer program of claim 14 wherein the security parameter is a WWN zoning parameter, wherein the network path is set up in accordance with the WWN zoning parameter.

* * * * *